Patented Apr. 16, 1946

2,398,672

UNITED STATES PATENT OFFICE 2,398,672

METHOD OF PREPARING ORGANO-POLYSILOXANES

Robert O. Sauer, Schenectady, N. Y., assignor to General Electric Company, a corporation of New York No Drawing. Application August 21, 1942, Serial No. 455,617

21 Claims. (Cl. 260—2)

This invention relates to an improved method of preparing organo-polysiloxanes frequently called silicone resins. It is more particularly concerned with an improved method of hydrolyzing organo-silicon halides, i. e., organo-halogeno-derivatives of silane, including mixtures thereof with a silicon tetrahalide, to form the corresponding hydroxy derivatives and polysiloxane condensation products thereof.

An object of the present invention is to provide a controlled method of hydrolyzing compositions containing organo-silicon halides, i. e., compounds having the formula $R_nSiX_{4-n}$ wherein R represents a monovalent hydrocarbon radical, X represents a halogen atom, specifically a chlorine or bromine atom, and $n$ is a whole number and is equal to at least 1 and is not more than 3, to form polysiloxane resins.

Another object of the invention is to provide a method of preparing organo-silicon (organo-polysiloxane) resins, films of which can be heated at elevated temperatures in the neighborhood of 200° C. for comparatively long periods of time without cracking or crazing.

A further object of the invention is to provide a practical method of hydrolyzing mixtures of halogenosilanes including monovalent hydrocarbon-substituted halogenosilanes whereby the desired organo-silicon resinous materials may be obtained without substantial gel formation.

Still another object of the invention is to provide a method of hydrolyzing mixtures comprising organo-silicon halides which requires the use of relatively inexpensive and non-inflammable solvents.

It was known prior to my invention that organo-silicon halides could be readily hydrolyzed. In order to decrease the rate of hydrolysis and subsequent condensation of the hydroxy products in the preparation of polysiloxane resins and thereby prevent or substantially prevent gelling of the products during the hydrolysis reaction, the hydrolysis step has been carried out by adding dilute solutions of the halogenosilanes in ethers to ice or mixtures of ice and water. The use of diethyl ether for this purpose is disclosed for example in Patent 2,258,218 issued to Eugene G. Rochow and in application S. N. 393,843, filed May 16, 1941, in the name of Eugene G. Rochow and assigned to the same assignee as the present invention. Although liquid resinous products can be obtained by this method of hydrolysis, heat-hardened films of the resinous products are often found to have the serious fault of cracking or crazing when heated for a relatively short time at 200° C. Furthermore, as this method requires the use of a large volume of a comparatively expensive solvent, it is necessary to reclaim the solvent in any large scale commercial project. The large scale reclamation involves a distinct fire hazard due to the volatility and inflammability of ether.

The present invention is based on my discovery that organo-polysiloxane resins of improved electrical and thermal stability may be obtained by employing a plurality of solvents in hydrolyzing the hydrocarbon-substituted halogeno-silanes and mixtures thereof with silicon tetrahalides, e. g., silicon tetrachloride or silicon tetrabromide. Briefly described, my process broadly comprises forming a solution of halogenosilanes in an inert, non-alcoholic organic solvent which is insoluble or substantially insoluble in water and which is selected from the class consisting of (1) aliphatic and aromatic liquid hydrocarbons, and (2) liquid ethers containing at least eight carbon atoms, and gradually adding this solution to a two-phase hydrolyzing medium comprising a mixture of water in an amount considerably in excess of that calculated as necessary to hydrolyze the silanes, and a liquid aliphatic alcohol which is not completely soluble in water but which dissolves an appreciable amount of water. Suitable alcohols are the liquid alcohols containing from four to eight carbon atoms per molecule, particularly the primary alcohols containing from four to six carbon atoms per molecule. Examples of suitable alcohols are n-butanol, isobutyl alcohol, n-amyl alcohol, secondary amyl alcohol, isoamyl alcohol, tertiary amyl alcohol, fusel oil, n-hexanol, methyl isobutyl carbinol, 2-ethyl butyl carbinol, methyl amyl carbinol, etc. As the alcoholic component of the hydrolyzing medium, I prefer to use n-butanol.

While toluene or xylene are the preferred non-alcoholic solvents for the silane derivatives, i. e., the organo-silicon halide compositions, other suitable organic solvents which are substantially immiscible with water and which do not react with the organo-silicon halides are benzene and various saturated or substantially saturated hydrocarbon fractions boiling between 75° and 250° C., such as n-heptane, benzine, ligroin, kerosene, etc., as well as the symmetrical ethers containing at least eight carbon atoms in the molecule, e. g., di-butyl ether, di-hexyl ether, etc.

In order that those skilled in the art better may understand how the present invention may be carried into effect, the following examples are given illustrating the preparation of polysiloxane resins from mixtures of halogenosilanes capable of forming a resin upon hydrolysis and condensation and including at least one halogenosilane containing at least three halogen atoms connected to the silicon atom thereof:

*Example 1*

A solution of 150 g. of a mixture of halogenosilanes consisting of about 56.5 mol per cent dimethyldichlorosilane, 29.0 mol per cent methyltrichlorosilane, and 14.5 mol per cent silicon tetrachloride in 100 grams of toluene was slowly added, with stirring, to a mixture of 300 g. of ice, 100 g. of water, and 100 g. of n-butanol over a seven-minute period. During the addition, the temperature of the mixture rose to 52° C. The mixture was vigorously stirred for 5 minutes, the layers allowed to separate, and the lower layer, comprising a water solution of hydrogen chloride, which was a product of the reaction, and some of the butanol, was removed. The remaining material was washed three times with 100 cc. portions of water and the washed product filtered to give 189.5 g. of a solution of silicones. No perceptible amount of gel was formed during hydrolysis. The product had a very good shelf life, that is, it could be stored for long periods of time without gellation taking place.

Films of this polysiloxane resin were prepared by repeatedly dipping a glass mat into the solution and heating the coated and impregnated mat for a short period of time after each dip in a 200° C. oven to partially cure the resin. A heat-hardened film prepared by dipping the mat four times in this manner was baked for 4 days at 200° C. without showing any signs of cracking or crazing.

*Example 2*

A solution of 300 g. of the organo-silicon halide mixture of Example 1 in 150 g. toluene was slowly added over a nine-minute period to a moderately stirred mixture of 800 g. of ice, 200 g. of water, and 200 g. of n-butanol. The final temperature was 34° C. After the resultant mixture had been stirred vigorously for 5 minutes, it was allowed to separate and the lower acid layer removed. The resin layer was washed once with 250 cc. of cold water, filtered, and flash-distilled to remove the solvents. A very small quantity of gel amounting to approximately one-half per cent by weight of the resin was collected on the filter. About 150 g. of a fluid resin was obtained. Films of this resin on a matted glass fiber base exhibited only a few cracks after being heated for 5 days at 200° C. Comparable films of a resin prepared from the same halogenosilane mixture by hydrolysis of an ethyl ether solution thereof were badly cracked or crazed after being heated overnight at 200° C.

*Example 3*

Example 2 was repeated using 300 g. of a mixture of halogenosilanes consisting of about 50 mol per cent dimethyldichlorosilane, 25.5 mol per cent methyltrichlorosilane and 24.5 mol per cent silicon tetrachloride. This mixture had a chlorine content of 67.5 per cent which corresponds to a methyl-to-silicon ratio of 1.25. Heat-hardened films of the fluid resin obtained by removal of the solvent by flash distillation crazed only slightly after 5 days heating at 200° C. Films of a resin prepared by adding an ether solution of the same halogenosilane mixture to water were very badly cracked and crazed after being heated overnight at the same temperature.

In the following example the reaction was controlled by externally cooling the butanol water mixture using tap water at a temperature of about 12° C.

*Example 4*

A solution of a mixture of methylchlorosilanes and silicon tetrachloride containing an average of 1.40 methyl groups per silicon atom was formed by dissolving 150 g. of the mixture in 75 g. toluene. The solution was slowly added over a period of 8 minutes to a mixture of 100 g. butanol and 400 g. water. The final temperature was 44° C. There was no perceptible gel formation during the reaction. The resulting resin possessed better thermal stability than did a comparable resin prepared by hydrolyzing an ether solution of the halogenosilane mixture.

Preferably part of the nonalcoholic solvent is added to the alcohol-water mixture instead of being used to dissolve the hydrolyzable halogenosilanes. This practice, which was followed in the subsequent examples, appears to have the advantageous effect of producing better resinous products, probably due to the fact that water is less soluble, for example, in a mixture of butanol and toluene than in butanol alone.

*Example 5*

A solution of 1800 g. of a halogenosilane mixture consisting of 59.4 mol per cent dimethyldichlorosilane, 22.8 mol per cent methyltrichlorosilane, and 17.8 mol per cent silicon tetrachloride in 600 g. toluene was slowly added to a mixture of 600 g. of toluene, 1200 g. of butanol, and 6000 g. of tap water. The temperature of the reaction mixture, which was not cooled, rose to about 70° C. The gel formed during the hydrolysis reaction amounted to about 0.6 per cent of the pure resin. Films of the resin on glass mats showed no visible signs of cracking when heated for 4 days at 200° C.

*Example 6*

A solution of 200 g. of the organo-silicon halide mixture used in Example 5 in 80 cc. toluene was added over a four minute period to a stirred, two-phase mixture of 80 cc. toluene, 170 cc. isoamyl alcohol, and 600 cc. tap water. Cooling of the reaction mixture was effected by means of a glass cooling coil through which was circulated tap water. About 100 grams of a concentrated resinous product substantially free of gel was obtained from the upper layer after removal of the solvents.

Similar products were obtained by employing heptanes, such as n-heptane, commercial mixed heptanes, ligroin having a boiling range between 75° and 115° C., or kerosene in place of the toluene, and by substituting n-butanol and isobutyl alcohol for the isoamyl alcohol.

*Example 7*

A solution of 200 g. of the organo-silicon halide mixture of Example 5 in 80 cc. benzene was added, over a 3½ minute period, to a mixture of 80 cc. benzene, 170 cc. isobutyl alcohol and 600 cc. tap water. The temperature of the reaction mixture, which was cooled as in Example 6, rose to about 43° C. The resinous layer was washed once with water, once with a dilute potassium carbonate solution, and finally with tap water until the wash water was neutral. On concentration of the 252 g. of varnish so obtained, 96 g. of resin was recovered. Little, if any, gel was formed during hydrolysis.

Example 8

A solution of 1800 g. of a chlorosilane mixture consisting of 59.4 mol per cent dimethyldichlorosilane, 22.8 mol per cent methyltrichlorosilane, and 17.8 mol per cent silicon tetrachloride in 600 g. xylene was slowly added to a stirred hydrolyzing medium consisting of 6000 g. water, 1200 g. n-butanol, and 600 g. xylene, cooled as in Example 6. The addition period was fifteen minutes during which time the temperature of the reaction mixture rose from 13 to 32° C. The aqueous layer was separated from the resultant product and the resinous layer washed with water. The amount of gel formed during hydrolysis was negligible, being approximately 0.6 per cent of the weight of the pure resin.

In the above examples my invention has been particularly described in connection with the controlled hydrolysis of mixtures of methyl silicon halides. Comparable results are obtained with other organo-silicon halides such as the ethyl, propyl, butyl, phenyl, propyl phenyl, etc. silicon halides. The process is also adapted to the hydrolysis of mixed organo-silicon halides, as for example mixtures comprising alkyl silicon halides or a silicon tetrahalide and an aryl silicon halide, as shown in the following examples:

Example 9

A solution of 12.9 g. of dimethyldichlorosilane and 21.1 g. of phenyltrichlorosilane in 17 cc. toluene was poured into a stirred mixture of 17 cc. of toluene, 36.3 cc. of butanol, and 17.5 cc. of water. 100 cc. of cold water was added and the acid-water layer removed. The residue was washed twice with water. Evaporation of the solvent from the remaining polysiloxane solution left a thin brown resinous liquid which slowly thickened and then solidified when heated at 200° C. for several days. A resin similarly prepared by adding an ether solution of the same silicon chlorides to water gelled in a comparatively short time when heated at 200° C. and shrinkage of the gelled mass on further heating left many cracks and bubbles in the final hardened mass.

Example 10

A solution of 83.5 g. phenyltrichlorosilane and 16.5 g. silicon tetrachloride in 40 cc. toluene was slowly added to a stirred mixture of 330 cc. water, 85 cc. n-butanol and 40 cc. toluene. The temperature rose from 20° to 65° during the addition time of 22 minutes. The aqueous layer was removed from the resultant mixture and the remaining resinous layer washed with water. No perceptible gel was formed in this case although the ratio of phenyl groups to silicon was only 0.8.

In general, it has been found that preferred proportions of water (including ice, if used), alcohol, and nonalcoholic, water-insoluble solvent used in the practice of my invention depend on a number of factors most of which involve the direct or indirect effect of each of the three components on the rate of hydrolysis of the particular silane derivative. These factors include the relative solubility of water and hydrochloric acid in the alcoholic phase and the concentration of the organo-silicon halides in the nonalcoholic solvent. The general basis for determining the proper concentrations and proportions of the different materials for any given combination thereof may be best understood from a consideration of the reactions which are believed to take place in the hydrolyzing medium, primarily in the alcoholic phase thereof.

The reactions theoretically involved during the course of the hydrolysis of the organo-silicon halides, for example, the organo-silicon chlorides, are believed to be essentially the following:

and

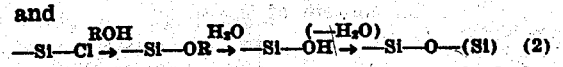

The rates of hydrolysis or alcoholysis of the halogenosilane (silicon halide) are in general faster than the rate of hydrolysis of the alkoxysilane. Considering the reactions set forth in Equation 1 it is obvious that the rate of the reaction between any given halogenosilane and water to form the intermediate silanol (silicol) is dependent upon the concentration of each of these substances in the alcoholic layer or phase of the hydrolyzing medium. The concentration of the halogenosilane may be controlled either by varying the concentration of the solution thereof in the nonalcoholic solvent or by increasing or decreasing the proportions of the alcoholic phase in relation to the amount of halogenosilane being treated. So long as both an aqueous phase and an alcoholic phase are present in the hydrolyzing medium, the concentration of water in the alcoholic phase is primarily dependent upon the solubility of water (or hydrochloric acid) in the particular alcohol. For any given alcohol, the effective concentration of water and also the alcohol may be decreased by adding some of the alcohol-soluble, water-immiscible solvent to the hydrolyzing medium. Equation 2 probably represents the course of a concurrent reaction in which the slower rate of hydrolysis of the alkoxy derivative determines to a large extent the actual overall rate of formation of the silanol intermediate and the silicone.

From a study of the hydrolysis of methylchlorosilanes, it is believed that the rate of dehydration of the methyl silanols to form a methyl polysiloxane resin increases rapidly with increasing hydrogen halide concentration so that when the acid concentration is at all appreciable, few silanol groups remain. The concentration of hydrogen halide at any particular time during the course of the hydrolysis reaction depends upon the following factors: (1) the fraction of the chlorosilane solution added to the alcohol-water suspension; (2) the total volume of the alcoholic phase (or layer) at that time, and (3) the solubility of the hydrogen halide in that phase (which also contains polysiloxanes, the non-alcoholic solvent and water in addition to the alcohol and hydrogen halide). The lower aqueous layer contains principally the hydrogen halide and more or less of the alcohol depending upon the concentration of hydrogen halide dissolved therein.

A detailed study to determine the preferred procedure for dehydrolyzing a mixture of dimethyldichlorosilane, methyltrichlorosilane, and silicon tetrachloride having a $CH_3/Si$ ratio of 1.44 using n-butanol and toluene when all of the toluene has been used to dissolve the chlorosilanes has shown that the best results are obtained by using about 50–70 parts by weight of toluene for each 100 parts of the chloro-silane mixture and hydrolyzing the chlorosilane mixture by adding the toluene solution to a stirred mixture of about 60–70 parts n-butanol and 250–350 parts of water. With a chlorosilane mixture containing more chlorine, i. e. having a $CH_3/Si$ ratio as low as 1.25, more toluene should generally be used. The designated proportions, however, are not absolutely critical. For example, satisfactory results have been obtained using from about 50-80 parts toluene, 50-75 parts butanol, and 200-400 parts water for each 100 parts of the chlorosilane mixture having a $CH_3/Si$ ratio of 1.44. Ordinarily, when the alcohol content of the hydrolysis medium is decreased, it is desirable to increase the amount of toluene or other nonalcoholic solvent used. When some of the inert solvent, for example, from one-third to one-half of the total amount used, is added to the hydrolysis medium, the relative proportions of both the alcohol and the inert solvent may be substantially increased.

The use of too little or too much water may result in excessive gel formation. This may be due to the resulting differences in acid concentration in the alcohol layer which is proportionately dependent upon the concentration of the hydrogen halide in the aqueous layer or phase. If the acid concentration in the alcoholic phase is too high, as when too little water is used, the silanol groups may be condensed more rapidly. In addition, the rate of hydrolysis of the alkoxy groups (Equation 2) may also be increased so that the more even condensation effected by their slow hydrolysis to condensable silanols no longer occurs. In a like manner the formation of gel when the amount of water is too large may be associated with the mutual solubilities of the systems, for example, the toluene-butanol-hydrochloric acid (aqueous) - polysiloxane system, making the water and hydrogen halide concentration in the alcohol layer too low for uniform condensation.

The resinous polysiloxanes obtained by means of my improved hydrolysis process and possessing improved thermal and electrical stability may be used in any of the numerous applications for which polysiloxane resins have previously been used. A number of these applications are set forth for example in Patents 2,258,218-222 issued to Eugene G. Rochow. Certain of the polysiloxanes prepared by this process are particularly amenable to further treatment in accordance with the catalytic process described and claimed in copending application S. N. 455,615 filed in the names of James G. E. Wright and James Marsden, now Patent No. 2,389,477, issued Nov. 20, 1945, and assigned to the same assignee as the present invention. The most useful polysiloxanes for this purpose are those prepared by using toluene, benzene, n-heptane, or kerosene as the inert solvent and n-butanol or isobutyl-alcohol as the alcoholic component of the hydrolysis medium.

Although I have described my invention with particular reference to the preparation of polysiloxane resins from certain specific organo-silicon halides, it is to be understood that it is broadly applicable to the hydrolysis of any organo-silicon halide of the formula $R_nSiX_{4-n}$ wherein R represents a monovalent, substituted or unsubstituted saturated aliphatic or aromatic hydrocarbon radical, X represents a halogen atom, e. g., chlorine, bromine, etc., and $n$ is a whole number and is at least 1 and is not more than three. Illustrative examples of radicals from which R may be chosen are alkyl (e. g. methyl, ethyl, propyl, butyl, etc.), including cycloaliphatic (e. g., cyclopentyl, cyclopentenyl, cyclohexyl, cyclohexenyl, cycloheptyl, etc.); aryl (e. g., phenyl diphenyl, naphthyl, tetrahydronaphthyl, anthracyl, etc.); alkaryl, including both mono- and poly-alkyl phenyl, mono- and poly-alkyl naphthyl, etc., radicals (e. g. tolyl, xylyl, mono-, di- and tri-ethyl phenyls, mono-, di- and tri-propyl phenyls, etc.); aralkyl (e. g., benzyl, phenylethyl, phenylpropyl, etc.); and their homologues, as well as those groups wherein one or more of the hydrogen atoms have been replaced by a suitable substituent group, for example, a halogen (chlorine, bromine, etc.).

What I claim as new and desire to secure by Letters Patent of the United States is:

1. In a method of making a polysiloxane resin from a mixture of halogenosilanes capable of forming a resin upon hydrolysis and condensation, said mixture including at least one monovalent hydrocarbon-substituted halogenosilane, the steps which comprise forming a solution of such mixture of halogenosilanes in an inert organic solvent selected from the group consisting of (1) liquid hydrocarbons and (2) liquid ethers containing at least eight carbon atoms, and hydrolyzing said mixture by slowly adding said solution to a two-phase hydrolyzing medium comprising water and an aliphatic alcohol containing at least four and not more than eight carbon atoms.

2. In a method of making a polysiloxane resin from a mixture of halogenosilanes capable of forming a resin upon hydrolysis and condensation, said mixture including at least one monovalent hydrocarbon-substituted halogenosilane and at least one halogenosilane containing at least three halogen atoms connected to the silicon atom thereof, the steps which comprise forming a solution of such mixture of halogenosilanes in an inert organic solvent selected from the group consisting of (1) liquid hydrocarbons and (2) liquid ethers containing at least eight carbon atoms, and hydrolyzing said mixture by slowly adding said solution to a two-phase hydrolyzing medium comprising water in excess of that calculated as necessary for compete hydrolysis of said mixture and an aliphatic alcohol containing at least four and not more than eight carbon atoms.

3. In a method of making a polysiloxane resin from a mixture of monovalent hydrocarbon-substituted halogenosilanes capable of forming a resin upon hydrolysis and condensation thereof and including at least one halogenosilane containing at least three halogen atoms connected to silicon, the steps which comprise: forming a solution of such mixture of halogenosilanes in an inert organic solvent selected from the group consisting of (1) liquid hydrocarbons and (2) liquid ethers containing at least eight carbon atoms, and hydrolyzing said mixture by slowly adding said solution to a two-phase hydrolyzing medium comprising water in excess of that calculated as necessary for complete hydrolysis of said mixture and an aliphatic alcohol containing at least four and not more than eight carbon atoms.

4. The method of making a polysiloxane resin from a mixture of halogenosilanes capable of forming a resin upon hydrolysis and condensation, said mixture comprising monovalent hydrocarbon-substituted halogenosilanes and a silicon tetrahalide, which comprises the steps of forming a solution of such mixture of halogenosilanes in an inert organic solvent selected from the group consisting of (1) liquid hydrocarbons and (2) liquid ethers containing at least eight carbon atoms, and hydrolyzing said mixture by slowly adding said solution to a two-phase hydrolyzing medium comprising water in excess of that calculated as necessary for complete hydrolysis of said mixture and an aliphatic alcohol containing at least four and not more than eight carbon atoms.

5. The method of making a polysiloxane resin from a mixture of halogenosilanes comprising a di-(monovalent hydrocarbon-substituted) halogenosilane and a silicon tetrahalide which comprises forming a solution of said mixture in a hydrocarbon solvent and hydrolyzing said mixture by slowly adding said solution to a two-phase hydrolyzing medium comprising a quantity of water considerably in excess of that calculated as necessary for complete hydrolysis of the halogenosilanes and an aliphatic alcohol containing from four to eight carbon atoms.

6. The method of making a polysiloxane resin from a mixture of halogenosilanes containing di- and mono- (monovalent hydrocarbon-substituted) halogenosilanes and a silicon tetrahalide which comprises forming a solution of such mixture in an inert hydrocarbon solvent and hydrolyzing said mixture by adding said solution to a two-phase hydrolyzing medium comprising an aliphatic alcohol containing at least four and not more than eight carbon atoms and a quantity of water considerably in excess of that calculated as necessary for complete hydrolysis of the halogenosilanes.

7. The method of claim 6 wherein the alcohol is n-butanol.

8. The method of making a polysiloxane resin which comprises forming a solution of a mixture of a dimethyldihalogenosilane, a mono- (monovalent hydrocarbon-substituted) halogenosilane and a silicon tetrahalide in an inert hydrocarbon solvent and hydrolyzing said mixture by adding slowly said solution to a two-phase hydrolyzing medium comprising an inert hydrocarbon solvent, a quantity of water considerably in excess of that calculated as necessary for complete hydrolysis of the mixture, and a primary aliphatic alcohol containing from four to eight carbon atoms.

9. The method of claim 8 wherein alcohol is n-butanol.

10. The method of making a polysiloxane resin from a mixture of methylhalogenosilanes and a silicon tetrahalide which comprises dissolving said mixture in an inert hydrocarbon solvent and hydrolyzing said mixture by adding said solution to a two-phase hydrolyzing medium comprising an inert hydrocarbon solvent, an aliphatic alcohol containing at least four and not more than eight carbon atoms and a quantity of water considerably in excess of that calculated as necessary for complete hydrolysis of said mixture.

11. The method of claim 10 wherein the alcohol is n-butanol.

12. The method of making a polysiloxane resin which comprises forming a solution of a mixture of a dimethyldihalogenosilane, a monomethyltrihalogenosilane and a silicon tetrahalide in an inert hydrocarbon solvent and hydrolyzing said mixture by adding said solution to a two-phase hydrolyzing medium comprising an inert hydrocarbon solvent, a quantity of water considerably in excess of that calculated as necessary for complete hydrolysis of said mixture, and a primary aliphatic alcohol containing from four to eight carbon atoms.

13. The method of claim 12 wherein the alcohol is n-butanol.

14. The method of making a polysiloxane resin from a mixture of methylhalogenosilanes and a silicon tetrahalide which comprises forming a solution of such mixture in toluene and hydrolyzing said mixture by adding said solution to a two-phase hydrolyzing medium comprising an aliphatic alcohol containing at least four and not more than eight carbon atoms and a quantity of water considerably in excess of that calculated as necessary for complete hydrolysis of said mixture.

15. The method of claim 14 wherein the alcohol is n-butanol.

16. The method of making a polysiloxane resin which comprises forming a solution of a mixture of a dimethyldihalogenosilane, a monomethyltrihalogenosilane and a silicon tetrahalide in an inert hydrocarbon solvent and hydrolyzing said mixture by adding said solution to a two-phase hydrolyzing medium comprising a quantity of water considerably in excess of that calculated as necessary for complete hydrolysis of said mixture, and a primary aliphatic alcohol containing from four to eight carbon atoms.

17. The method of claim 16 wherein the alcohol is n-butanol.

18. The method of making a polysiloxane resin which comprises forming a solution of a mixture of dimethyldichlorosilane, methyltrichlorosilane and silicon tetrachloride in an inert hydrocarbon solvent and hydrolyzing said mixture by adding said solution to a two-phase hydrolyzing medium comprising an inert aromatic hydrocarbon solvent, n-butanol, and a quantity of water considerably in excess of that calculated as necessary for complete hydrolysis of said mixture.

19. The method of claim 18 wherein the inert hydrocarbon solvent is xylene.

20. The method of making a polysiloxane resin from a mixture of a dimethyldichlorosilane, a monomethyltrichlorosilane, and silicon tetrachloride which comprises forming a toluene solution of said mixture and hydrolyzing said mixture by adding said solution to a two-phase hydrolyzing medium comprising toluene, n-butanol and a quantity of water considerably in excess of that calculated as necessary for complete hydrolysis of said mixture.

21. The method of making a polysiloxane resin from a mixture of dimethyldichlorosilane, methyltrichlorosilane and silicon tetrachloride, which comprises forming a solution of said mixture in n-heptane and hydrolyzing said mixture by slowly adding said solution to a two-phase medium comprising n-heptane, n-butanol, and a quantity of water considerably in excess of that calculated as necessary for complete hydrolysis of the mixture.

ROBERT O. SAUER.

Certificate of Correction

Patent No. 2,398,672. April 16, 1946.

ROBERT O. SAUER

It is hereby certified that errors appear in the printed specification of the above numbered patent requiring correction as follows: Page 3, second column, line 36, for "Equation 2" read *Equation (2)*; line 63, for "dehydrolyzing" read *hydrolyzing*; page 5, first column, line 50, claim 10, for "mixtule" read *mixture*; and that the said Letters Patent should be read with these corrections therein that the same may conform to the record of the case in the Patent Office.

Signed and sealed this 17th day of December, A. D. 1946.

[SEAL]

LESLIE FRAZER,
*First Assistant Commissioner of Patents.*